US011093789B2

(12) United States Patent
Wang et al.

(10) Patent No.: US 11,093,789 B2
(45) Date of Patent: Aug. 17, 2021

(54) METHOD AND APPARATUS FOR OBJECT RE-IDENTIFICATION

(71) Applicant: TuSimple, Inc., San Diego, CA (US)

(72) Inventors: Naiyan Wang, Beijing (CN); Jianfu Zhang, Beijing (CN)

(73) Assignee: TUSIMPLE, INC., San Diego, CA (US)

(*) Notice: Subject to any disclaimer, the term of this patent is extended or adjusted under 35 U.S.C. 154(b) by 222 days.

(21) Appl. No.: 16/273,835

(22) Filed: Feb. 12, 2019

(65) Prior Publication Data
US 2019/0279028 A1 Sep. 12, 2019

(30) Foreign Application Priority Data

Dec. 12, 2017 (CN) ......................... 201711313905.4

(51) Int. Cl.
G06K 9/62 (2006.01)
G06K 9/46 (2006.01)
G06N 3/02 (2006.01)

(52) U.S. Cl.
CPC ............ G06K 9/6212 (2013.01); G06K 9/46 (2013.01); G06K 9/6262 (2013.01); G06N 3/02 (2013.01); G06K 9/6256 (2013.01)

(58) Field of Classification Search
None
See application file for complete search history.

(56) References Cited

U.S. PATENT DOCUMENTS 9,117,147 B2   8/2015  Shet et al.
9,449,258 B1*  9/2016  Palacio ................ H04N 5/247
(Continued)

FOREIGN PATENT DOCUMENTS

CN  103984915 Y  8/2014
CN  105518744 A  4/2016
(Continued)

OTHER PUBLICATIONS

Zheng, Liang et al. "Scalable Person Re-identification: A Benchmark." IEEE International Conference on Computer Vision (ICCV), Santiago, Chile, 2015, pp. 1116-1124.
(Continued)

Primary Examiner — Gandhi Thirugnanam
(74) Attorney, Agent, or Firm — Paul Liu; Perkins Coie, LLP

(57) ABSTRACT

The present disclosure provides a method and an apparatus for object re-identification, capable of solving the problem in the related art associated with inefficiency and low accuracy of object re-identification based on multiple frames of images. The method includes, for each pair of objects: selecting one of a set of images associated with each of the pair of objects, to constitute a pair of current images for the pair of objects; inputting the pair of current images to a preconfigured feature extraction network, to obtain feature information for the pair of current images; determining whether the pair of objects are one and the same object based on the feature information for the pair of current images and feature information for one or more pairs of historical images for the pair of objects by using a preconfigured re-identification network; and outputting a determination result of said determining when the determination result is that the pair of objects are one and the same object or that the pair of objects are not one and the same object, or repeating the above steps using the pair of current images as a pair of historical images for the pair of objects when the determination result is that it is uncertain whether the pair of objects are one and the same object. With the solutions according to the present disclosure, the speed and efficiency of the object re-identification can be improved.

20 Claims, 5 Drawing Sheets

(56) References Cited

U.S. PATENT DOCUMENTS

| | | | | |
|---|---|---|---|---|
| 10,176,405 B1* | 1/2019 | Zhou | ............ | G06K 9/6269 |
| 10,311,332 B2* | 6/2019 | Bergsma | ............ | G06K 9/6215 |
| 2007/0211938 A1* | 9/2007 | Tu | ............ | G06K 9/00295 |
| | | | | 382/170 |
| 2013/0343642 A1* | 12/2013 | Kuo | ............ | G06K 9/4652 |
| | | | | 382/159 |
| 2014/0098221 A1* | 4/2014 | Brown | ............ | G06T 7/194 |
| | | | | 348/135 |
| 2014/0184803 A1* | 7/2014 | Chu | ............ | G06T 7/292 |
| | | | | 348/159 |
| 2017/0177946 A1* | 6/2017 | Citerin | ............ | G06K 9/4671 |
| 2018/0253596 A1* | 9/2018 | Barman | ............ | G06K 9/00369 |
| 2018/0286081 A1* | 10/2018 | Koperski | ............ | G06K 9/00771 |
| 2019/0042867 A1* | 2/2019 | Chen | ............ | G06K 9/46 |
| 2019/0079534 A1* | 3/2019 | Zhu | ............ | G06K 9/6267 |
| 2019/0279028 A1* | 9/2019 | Wang | ............ | G06N 3/08 |
| 2020/0097742 A1* | 3/2020 | Ratnesh Kumar | ... | G06N 3/0454 |
| 2020/0184256 A1* | 6/2020 | Ye | ............ | G06K 9/00369 |
| 2020/0226421 A1* | 7/2020 | Almazan | ............ | G06N 3/084 |
| 2020/0285896 A1* | 9/2020 | Huang | ............ | G06K 9/6256 |
| 2020/0302176 A1* | 9/2020 | Yang | ............ | G06K 9/627 |
| 2020/0302186 A1* | 9/2020 | Yang | ............ | G06K 9/00771 |
| 2020/0342271 A1* | 10/2020 | Wang | ............ | G06K 9/6256 |

FOREIGN PATENT DOCUMENTS

| | | |
|---|---|---|
| CN | 105574505 A | 5/2016 |
| CN | 106096568 Y | 11/2016 |
| CN | 106971178 A | 7/2017 |

OTHER PUBLICATIONS

McLaughlin, N. et al. "Recurrent Convolutional Network for Video-Based Person Re-identification," 2016 IEEE Conference on Computer Vision and Pattern Recognition (CVPR), Las Vegas, NV, USA, 2016, pp. 1325-1334, doi: 10.1109/CVPR.2016.148.

No Author. Chinese Application No. 201711313905.4, Second Office Action dated Aug. 10, 2019, pp. 1-8.

No Author. Chinese Application No. 201711313905.4, First Office Action dated Mar. 27, 2019, pp. 1-13.

No Author. Chinese Application No. 201711313905.4, First Search dated Mar. 22, 2019, pp. 1-2.

No Author. Chinese Application No. 201711313905.4, Review Notice dated Oct. 8, 2019, pp. 1-3.

* cited by examiner

METHOD AND APPARATUS FOR OBJECT RE-IDENTIFICATION

CROSS-REFERENCE TO RELATED APPLICATION(S)

This U.S. patent document claims the priority of and the benefits of Chinese Patent Application No. 201711313905.4 of the same title and content that was filed by Applicant Beijing Tusen Weilai Technology Co., Ltd. at the State Intellectual Property Office of China (SIPO) on Dec. 12, 2017.

TECHNICAL FIELD

The present disclosure relates to computer vision technology, and more particularly, to a method and an apparatus for object re-identification.

BACKGROUND

Person re-identification, or Person Re-ID, is to identify whether persons in a pair of images or a pair of sequence images are one and the same person by using computer vision technology. Images of one person are retrieved from different camera devices to compensate for limitation on visions of the existing camera devices. Person re-identification can be widely applied in intelligent video surveillance, intelligent security, smart driving and the like.

Due to differences among various camera devices and both rigidity and flexibility of a person, person re-identification may be influenced by clothes, scales, occlusions, gestures and view angles and thus becomes a technique that is both highly valuable to research and extremely challenging in the computer vision technology.

With the wide application of deep learning in the computer vision technology, there have been breakthroughs in person re-identification based on one single frame of image in recent years. However, person re-identification based on multiple frames of images is still a difficult problem.

Currently, person re-identification based on multiple frames of images is mainly based on comparison and identification by combining deep neural network features using a pooling approach. For example, it has been proposed by Liang Zheng, et al., *Scalable Person Re-identification: A Benchmark*, to achieve person re-identification by extracting information using a convolutional neural network and then combining features from multiple frames by means of average pooling. As another example, it has been proposed by Niall McLaughlin, *Recurrent Convolutional Network for Video-Based Person Re-identification*, to achieve person re-identification by extracting features from images and optical flow information using a convolutional neural network and a recurrent neural network and combining time sequence information by means of time sequence pooling.

However, for each pair of persons, the existing schemes for person re-identification based on multiple frames of images need to use all images associated with the two persons in the pair for combination and identification. There are two technical problems for this solution, as follows:

Technical Problem 1: A camera device may capture images with a high frequency (e.g., 30 frames per second) and a number of consecutively captured frames of images may contain substantially the same content. Due to high redundancy among the images, if all images associated with a pair of persons are to be combined and identified, there would be a large amount of data and it would be inefficient.

Technical Problem 2: Some of the images for use may have low qualities, e.g., they may contain occlusions or blurs. If these low-quality images are used in the identification, the overall accuracy of the person re-identification may be lowered.

SUMMARY

In view of the above problem, the present disclosure provides a method and an apparatus for object re-identification, capable of solving the problem in the related art associated with inefficiency and low accuracy of object re-identification based on multiple frames of images. The solutions of the present disclosure can be applied widely to various scenarios, including e.g., person re-identification, vehicle re-identification, bicycle re-identification and the like. The present disclosure is not limited to any specific application scenario.

In an aspect, according to some embodiments of the present disclosure, a method for object re-identification is provided. The method includes, for each pair of objects: selecting one image from each of two sets of images associated with two objects in the pair of objects respectively, to constitute a pair of current images for the pair of objects; inputting the pair of current images to a preconfigured feature extraction network, to obtain feature information for the pair of current images; determining whether the pair of objects are one and the same object based on the feature information for the pair of current images and feature information for one or more pairs of historical images for the pair of objects by using a preconfigured re-identification network; and outputting a determination result of said determining when the determination result is that the pair of objects are one and the same object or that the pair of objects are not one and the same object, or repeating the above steps using the pair of current images as a pair of historical images for the pair of objects when the determination result is that it is uncertain whether the pair of objects are one and the same object.

In another aspect, according to some embodiments of the present disclosure, an apparatus for object re-identification is provided. The apparatus includes a selecting unit, a feature extracting unit, a determining unit and a processing unit. For each pair of objects: the selecting unit is configured to select one image from each of two sets of images associated with two objects in the pair of objects respectively, to constitute a pair of current images for the pair of objects; the feature extracting unit is configured to input the pair of current images to a preconfigured feature extraction network, to obtain feature information for the pair of current images; the determining unit is configured to determine whether the pair of objects are one and the same object based on the feature information for the pair of current images and feature information for one or more pairs of historical images for the pair of objects by using a preconfigured re-identification network; and the processing unit is configured to output a determination result obtained by the determining unit when the determination result is that the pair of objects are one and the same object or that the pair of objects are not one and the same object, or use the pair of current images as a pair of historical images for the pair of objects and trigger the selecting unit when the determination result is that it is uncertain whether the pair of objects are one and the same object.

With the solutions of the present disclosure, when identifying an object, one image is selected from each of two sets of images associated with two objects in a pair of objects respectively, to constitute a pair of current images. If it can be determined certainly based on the pair of current images whether the pair of objects are one and the same object or not, a determination result can be outputted directly, without using more images of the pair of objects for determination, such that the speed and efficiency of the re-identification can be improved. If it cannot be determined certainly based on the pair of current images whether the pair of objects are one and the same object or not, another pair of images can be selected for further determination. In this way, when the selected pair of images include one or more low-quality images containing e.g., occlusions or blurs, other high-quality images can be selected intelligently for further determination, such that the impact of the low-quality images on the accuracy of the re-identification can be reduced and the overall accuracy of the object re-identification can be improved.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The method and apparatus for object re-identification according to the embodiments of the present disclosure may be widely applied to various scenarios, e.g., person re-identification and vehicle re-identification. The present disclosure may be applied in the field of security protection and the field of automated driving. The present disclosure is not limited to any specific application scenario.

The general principle of the embodiments of the present disclosure includes the following parts.

Figure 1:
FIG. 1 is a schematic diagram showing a set of images associated with each person as created according to some embodiments of the present disclosure.

First, object detection and tracking may be performed on images captured by a plurality of camera devices (e.g., for objects of interest, including persons or vehicles) to obtain a set of images corresponding to each object. The object detection and tracking may be achieved by manual labeling or by using a predetermined algorithm (the present disclosure is not limited to any of these). FIG. 1 shows respective sets of images associated with four persons, each set of images including a plurality of frames of images.

Finally, sequentially for each pair of objects, the method for object re-identification according to the embodiments of the present disclosure may be applied to determine whether the pair of objects are one and the same object.

Embodiment 1

Figure 2:
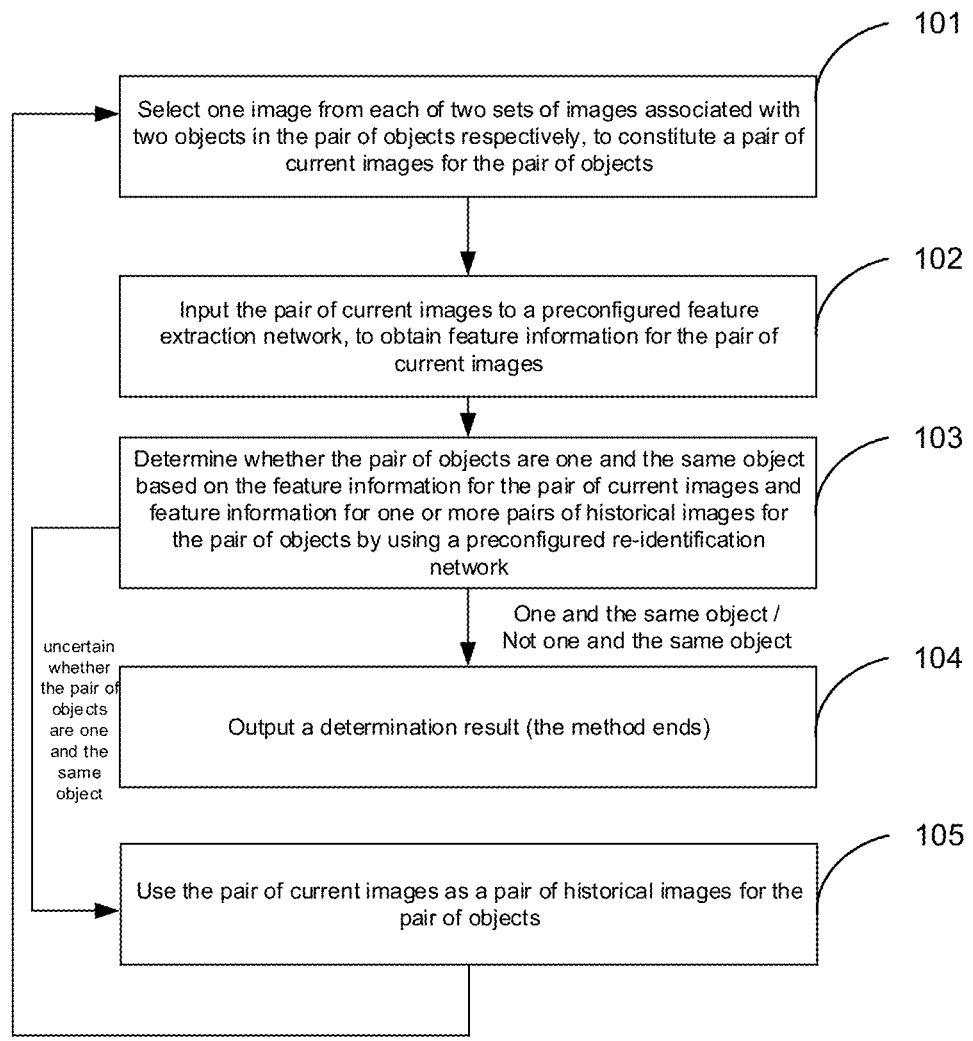
FIG. 2 is a flowchart illustrating a method for object re-identification according to some embodiments of the present disclosure.

FIG. 2 is a flowchart illustrating a method for object re-identification according to some embodiments of the present disclosure. The method includes the following steps for each pair of objects.

At step 101, one image is selected from each of two sets of images associated with two objects in the pair of objects respectively, to constitute a pair of current images for the pair of objects.

In some embodiments of the present disclosure, one image may be selected from each set of images randomly or in chronological order and the present disclosure is not limited thereto.

At step 102, the pair of current images are inputted to a preconfigured feature extraction network, to obtain feature information for the pair of current images.

At step 103, it is determined whether the pair of objects are one and the same object based on the feature information for the pair of current images and feature information for one or more pairs of historical images for the pair of objects by using a preconfigured re-identification network. If a determination result of this step is that the pair of objects are one and the same object or that the pair of objects are not one and the same object, the method proceeds with step 104. If the determination result is that it is uncertain whether the pair of objects are one and the same object, the method proceeds with the step 105.

At step 104, the determination result is outputted and the method ends.

At step 105, the pair of current images are used as a pair of historical images for the pair of objects and the method proceeds with the step 101.

Preferably, the above step 103 of determining whether the pair of objects are one and the same object based on the feature information for the pair of current images and the feature information for the one or more pairs of historical images for the pair of objects by using the preconfigured re-identification network may include the following steps A1~A2.

At step A1, input information to the re-identification network is calculated based on the feature information for the pair of current images and the feature information for the one or more pairs of historical images for the pair of objects.

At step A2, the input information is inputted to the re-identification network to obtain the determination result as to whether the pair of objects are one and the same object.

Preferably, the above step A2 may include inputting the input information to the re-identification network; calculating for the pair of objects, by using the re-identification network, an evaluation value for each of a result that the pair of objects are one and the same object, a result that the pair of objects are not one and the same object or a result that it is uncertain whether the pair of objects are one and the same object, and determining one of the results that has the largest evaluation value as the determination result. In some embodiments of the present disclosure, the evaluation value for the result that the pair of objects are one and the same object is represented as $Q_s$, the evaluation value for the result that the pair of objects are not one and the same object is represented as $Q_d$, and the evaluation value for the result that it is uncertain whether the pair of objects are one and the same object is represented as $Q_u$.

Preferably, in order to prevent the method shown in FIG. 1 from running into an infinite loop without stop due to some extreme case (e.g., when consecutive determination results are always that it is uncertain whether the pair of objects are one and the same object), in an embodiment of the present disclosure, an end condition may be set in advance. For example, the end condition may be set as terminating the loop when the number of consecutive determination results that it is uncertain whether the pair of objects are one and the same object reaches a predetermined number threshold, or terminating the loop when all the pairs of images in the respective sets of images associated with the two objects in the pair of objects have been used in the calculation. In this case, the above step 103 may be implemented as follows.

In the step 103, it is determined whether the pair of objects are one and the same object based on the feature information for the pair of current images and the feature information for the one or more pairs of historical images for the pair of objects by using the preconfigured re-identification network. If a determination result of this step is that the pair of objects are one and the same object or that the pair of objects are not one and the same object, the method proceeds with step 104. If the determination result is that it is uncertain whether the pair of objects are one and the same object, it is determined whether the predetermined end condition is satisfied. If the predetermined end condition is not satisfied, the method proceeds with the step 105. If the predetermined end condition is satisfied, the evaluation value for the result that the pair of objects are one and the same object and the evaluation value for the result that the pair of objects are not one and the same object, as obtained in the current calculation, are compared and the result having the larger evaluation value is used as the final determination result. For example, when $Q_s$ is larger than $Q_d$, it is determined that the pair of objects are one and the same object. When $Q_s$ is smaller than $Q_d$, it is determined that the pair of objects are not one and the same object.

The above step A1 may be implemented in any of the following Schemes 1~7, as non-limiting examples.

In the following, a plurality of steps (Step A, Step B and Step C) that may be included in the Schemes 1~7 are explained.

Step A: Differences between respective features of two images in the pair of current images are calculated to obtain a feature difference vector for the pair of current images.

Step B: A weighted average of feature difference vectors for the one or more pairs of historical images is calculated to obtain a historical feature difference vector.

Step C: The images in the pair of current images and the one or more pairs of historical images for the pair of objects are divided into two sets of images in accordance with their associated objects, every two images in the two sets of images are paired to obtain a plurality of regrouped pairs of images, a matching value between respective features of two images in each of the plurality of regrouped pairs of images is calculated, and a distance feature is determined based on the matching values for all of the plurality of regrouped pairs of images.

Here, in the above step C, the type of the matching value may be a distance value, a dot product value, or both. For different types of matching values, their corresponding distance features may be different, as follows.

Case 1: When the matching value is a distance value, in the step C, the operations of calculating the matching value between the respective features of the two images in each of the plurality of regrouped pairs of images and determining the distance feature based on the matching values for all of the plurality of regrouped pairs of images may include: calculating a distance value between the respective features of the two images in each of the plurality of regrouped pairs of images; selecting a maximum distance value and a minimum distance value among the distance values for all the plurality of regrouped pairs of images, and calculating an average of the distance values for all the plurality of regrouped pairs of images to obtain an average distance value; and determining the maximum distance value, the minimum distance value and the average distance value as the distance feature.

In some embodiments of the present disclosure, the above distance value may be a Euclidean distance, a Manhattan distance, a Chebyshev distance, a Minkowski distance, a cosine distance or a Mahalanobis distance. The present disclosure is not limited to any of these.

Case 2: When the matching value is a dot product value, in the step C, the operations of calculating the matching value between the respective features of the two images in each of the plurality of regrouped pairs of images and determining the distance feature based on the matching values for all of the plurality of regrouped pairs of images may include: calculating a dot product value between the respective features of the two images in each of the plurality of regrouped pairs of images; selecting a maximum dot product value and a minimum dot product value among the dot product values for all the plurality of regrouped pairs of images, and calculating an average of the dot product values for all the plurality of regrouped pairs of images to obtain an average dot product value; and determining the maximum dot product value, the minimum dot product value and the average dot product value as the distance feature.

Case 3: When the matching value includes a distance value and a dot product value, in the step C, the operations of calculating the matching value between the respective features of the two images in each of the plurality of regrouped pairs of images and determining the distance feature based on the matching values for all of the plurality of regrouped pairs of images may include: calculating a distance value between the respective features of the two images in each of the plurality of regrouped pairs of images, selecting a maximum distance value and a minimum distance value among the distance values for all the plurality of regrouped pairs of images, and calculating an average of the distance values for all the plurality of regrouped pairs of images to obtain an average distance value; calculating a dot product value between the respective features of the two images in each of the plurality of regrouped pairs of images, selecting a maximum dot product value and a minimum dot product value among the dot product values for all the plurality of regrouped pairs of images, and calculating an average of the dot product values for all the plurality of regrouped pairs of images to obtain an average dot product value; and determining the maximum distance value, the minimum distance value, the average distance value, the maximum dot product value, the minimum dot product value and the average dot product value as the distance feature.

Scheme 1: The step A is performed, and the feature difference vector for the pair of current images as obtained from the step A is used as the input information to the re-identification network.

Scheme 2: The step B is performed, and the historical feature difference vector as obtained from the step B is used as the input information to the re-identification network.

Scheme 3: The step C is performed, and the distance feature as obtained from the step C is used as the input information to the re-identification network.

Scheme 4: The steps A and B are performed, and the feature difference vector for the pair of current images as obtained from the step A and the historical feature difference vector as obtained from the step B are used as the input information to the re-identification network.

Scheme 5: The steps A and C are performed, and the feature difference vector for the pair of current images as obtained from the step A and the distance feature as obtained from the step C are used as the input information to the re-identification network.

Scheme 6: The steps B and C are performed, and the historical feature difference vector as obtained from the step B and the distance feature as obtained from the step C are used as the input information to the re-identification network.

Scheme 7: The steps A, B and C are performed, and the feature difference vector for the pair of current images as obtained from the step A, the historical feature difference vector as obtained from the step B and the distance feature as obtained from the step C are used as the input information to the re-identification network.

In the following, specific examples are given to explain the calculations of the feature difference vector for the pair of current images, the historical feature difference vector and the distance feature according to the embodiments of the present disclosure in further detail, such that the solutions of the present disclosure can be better understood by those skilled in the art.

It is assumed that the pair of current images are the t-th pair of images for the pair of objects (the pair of current images include Image $A_t$ and Image $B_t$ and are denoted as $A_t\&B_t$) and that the pair of objects have t−1 pairs of historical images. The feature information for Image $A_t$ is $X=\{X_1, X_2, \ldots, X_n\}$ and the feature information for Image $B_t$ is $Y=\{Y_1, Y_2, \ldots, Y_n\}$. The feature difference vectors for the respective pairs of historical images are denoted as $O_1, O_2, \ldots, O_{t-1}$, respectively, and the feature difference vector for the pair of current images is denoted as $O_t$. The feature difference vector for the pair of current images and the historical feature difference vector may be calculated according to the following Equations (1) and (2).

The feature difference vector for the pair of images $A_t\&B_t$ may be calculated as:

$$O_t=\{(X_1-Y_1), (X_2-Y_2), \ldots, (X_n-Y_n)\}. \quad (1)$$

The weighted average of the feature difference vectors for the respective pairs of historical images may be calculated as:

$$h_t = \frac{\sum_{i=1}^{i=t-1}(w_i \times O_i)}{\sum_{i=1}^{i=t-1} w_i} \quad (2)$$

where $h_t$ is the historical feature difference vector to be calculated, $w_i$ is a weight value for the i-th pair of historical images, and $O_i$ is the feature difference vector for the i-th pair of historical images.

Here, preferably, in some embodiments of the present disclosure, the weight values for the respective pairs of historical images may be calculated as:

$$w_i = 1 - \frac{e^{Q_u}}{e^{Q_s} + e^{Q_d} + e^{Q_u}} \quad (3)$$

where $w_i$ is a weight value for the i-th pair of historical images, and $Q_s$, $Q_d$ and $Q_u$ denote the evaluation value for the result that the pair of objects are one and the same object, the evaluation value for the result that the pair of objects are not one and the same object and the evaluation value for the result that it is uncertain whether the pair of objects are one and the same object, respectively, as determined by the re-identification network for the i-th pair of historical images.

With the weight values set according to Equation (3), a pair of image having a larger $Q_u$ may have a smaller weight value and a pair of image having a smaller $Q_u$ may have a larger weight value.

Of course, different settings of the weight values can be used by those skilled in the art depending on actual situations. For example, the weight values for all the pairs of historical images can be simply set to 1. The present disclosure is not limited to any specific setting of the weight values.

Assuming that the pair of current images for the pair of objects are the second pair of images, i.e., t=2, the pair of historical images for the pair of objects are the first pair of images including Image $A_1$ and Image $B_1$ and denoted as $A_1\&B_1$. The pair of current images for the pair of objects are the second pair of images including Image $A_2$ and Image $B_2$ and denoted as $A_2\&B_2$. The feature difference vector for the pair of current images is $O_2$, the historical feature difference vector is $h_2$, and the distance feature may be calculated as follows.

First, the pair of current images and the pair of historical images are re-paired to form four regrouped pairs of images, which are $A_1\&B_1$, $A_1\&B_2$, $A_2\&B_1$ and $A_2\&B_2$. Here $A_i\&B_j$ denotes the regrouped pair of images including Image $A_i$ and Image $B_j$. The feature information for $A_i$ is $X_i=\{X_{i1}, X_{i2}, \ldots, X_{in}\}$ and the feature information for Image $B_j$ is $Y_j=\{Y_{j1}, Y_{j2}, \ldots, Y_{jn}\}$.

Second, a distance value between the respective features of the two images in each of the regrouped pairs of images is calculated according to Equation (4) below, the distance values being denoted as $d_{11}$, $d_{12}$, $d_{21}$ and $d_{22}$, respectively. A dot product value between the respective features of the two images in each of the regrouped pairs of images is calculated according to Equation (5) below, the dot product values being denoted as $DJ_{11}$, $DJ_{12}$, $DJ_{21}$ and $DJ_{22}$, respectively.

$$d_{ij} = \sqrt{\sum_{k=1}^{k=n}(X_{ik} - Y_{jk})^2} \quad (4)$$

$$DJ_{ij} = \sum_{k=1}^{k=n} (X_{ik} \times Y_{jk}) \quad (5)$$

where $d_{ij}$ denotes a distance value for the regrouped pair of images $A_i \& B_j$, and $DJ_{ij}$ denotes a dot product value for the regrouped pair of images $A_i \& B_j$.

Next, a maximum distance value, a minimum distance value and an average distance value is determined from the distance values for all the regrouped pairs of images, respectively, as: $d_{max}=\max\{d_{11}, d_{12}, d_{21}, d_{22}\}$, $d_{mm}=\min\{d_{11}, d_{12}, d_{21}, d_{22}\}$, and $d_{ave}=(d_{11}+d_{12}+d_{21}+d_{22})/4$.

Then, a maximum dot product value, a minimum dot product value and an average dot product value is determined from the dot products for all the regrouped pairs of images, respectively, as: $DJ_{max}=\max\{DJ_{11}, DJ_{12}, DJ_{21}, DJ_{22}\}$, $DJ_{min}=\min\{DJ_{11}, DJ_{12}, DJ_{21}, DJ_{22}\}$, and $DJ_{ave}=(DJ_{11}+DJ_{12}+DJ_{21}+DJ_{22})/4$.

Finally, $d_{max}$, $d_{min}$ and $d_{ave}$ may be used as the distance feature, or $DJ_{max}$, $DJ_{min}$ and $DJ_{ave}$ may be used as the distance feature, or $d_{max}$, $d_{min}$, $d_{ave}$, $DJ_{max}$, $DJ_{min}$ and $DJ_{ave}$ may be used as the distance feature.

Figure 3:
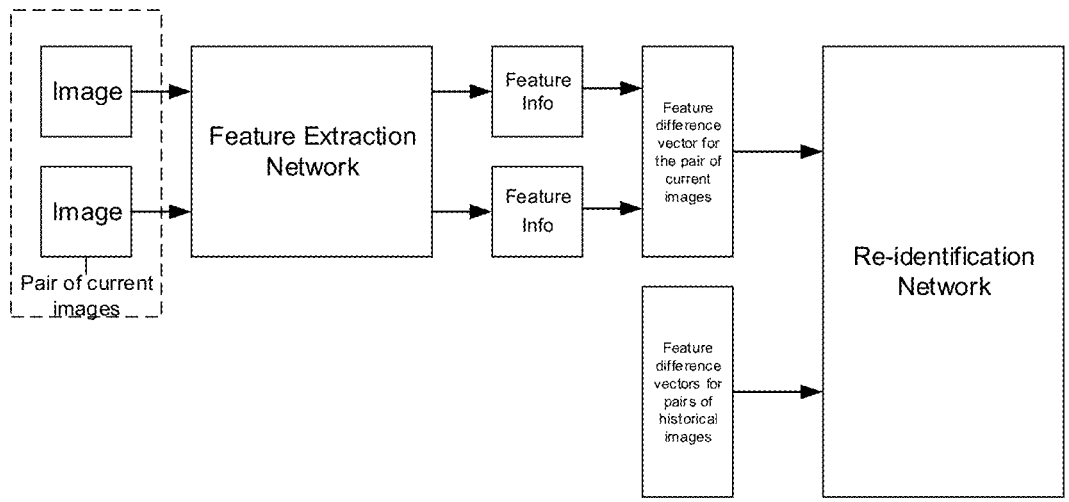
FIG. 3 is a first schematic diagram showing a structure of a network for object re-identification according to some embodiments of the present disclosure.
Figure 4:
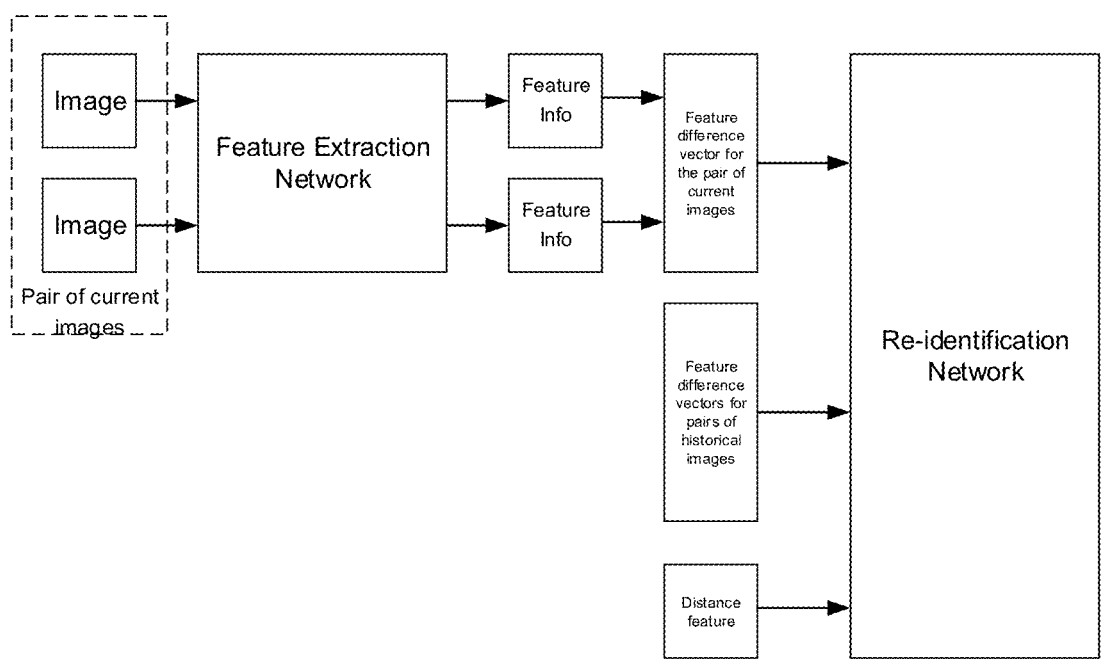
FIG. 4 is a second schematic diagram showing a structure of a network for object re-identification according to some embodiments of the present disclosure.

FIG. 3 is a schematic diagram showing an example in which the input information to the re-identification network is the feature difference vector for the pair of current images and the historical feature difference vector as obtained by applying the above Scheme 4. FIG. 4 is a schematic diagram showing an example in which the input information to the re-identification network is the feature difference vector for the pair of current images, the historical feature difference vector and the distance feature as obtained by applying the above Scheme 7.

In some embodiments of the present disclosure, the feature extraction network may be obtained by training a model based on any neural network in the related art that is capable of extracting features from images.

Figure 5:
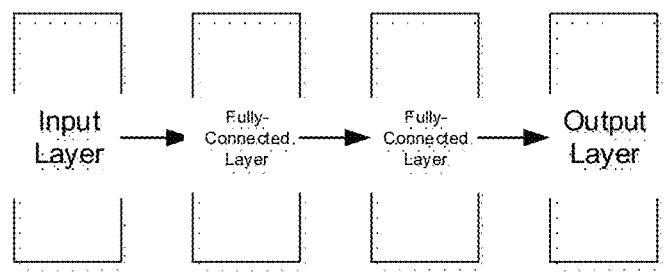
FIG. 5 is a schematic diagram showing a re-identification network according to some embodiments of the present disclosure.

In some embodiments of the present disclosure, the re-identification network may have an exemplary structure including sequentially an input layer, two fully connected layers and an output layer, as shown in FIG. 5. For example, each fully connected layer may have 128 dimensions and the output layer may have 3 dimensions. The specific structure of the re-identification network can be configured flexibly by those skilled in the art depending on actual requirements, and the present disclosure is not limited to any specific structure of the re-identification network.

In the following, a brief description is given to explain how the feature extraction network and the re-identification network used in the object re-identification according to the embodiments of the present disclosure are trained, such that it can be better understood by those skilled in the art.

First, a set of training samples is created by means of manual screening or by using an object tracking algorithm. The set of training samples includes sets of images associated with a number of sample objects respectively. For example, in an application scenario of person re-identification, N sets of images are created for N sample persons. In an application scenario of vehicle re-identification, M sets of images are created for M sample vehicles.

Second, every two of the sample objects are paired to obtain a number of pairs of objects, and a result as to whether each pair of objects are one and same object is labeled. The labeled results are true results.

Then, an initial feature extraction network and an initial re-identification network are created.

In some embodiments of the present disclosure, the structure of the initial feature extraction network and the structure of the initial re-identification network may be created. Alternatively, a convolutional neural network in the related art that is capable of feature extraction may be selected as the initial feature extraction network.

Finally, the initial feature extraction network and the initial re-identification network are trained iteratively based on the created set of samples and the labeled results until a predetermined iteration end condition is satisfied. The feature extraction network and the re-identification network obtained when the iterative training ends are used as the final network models.

In some embodiments of the present disclosure, the iteration end condition may be any of the following: the number of iterative trainings reaching a predetermined number threshold, an identification accuracy of the re-identification network reaching a predetermined accuracy threshold, or the re-identification network satisfying a predetermined convergence condition. Any iterative training methods in the related art, e.g., the gradient descent method, may be used, and the present disclosure is not limited to any specific iterative training method.

In an example, more specifically, the feature extraction network and the re-identification network may be iteratively trained as follows. First, one image may be selected randomly from each of two sets of images associated with two objects in a pair of current objects respectively to constitute a pair of current images. Second, feature information for the pair of current images is extracted using the feature extraction network. Then, input information to the re-identification network is calculated based on the feature information for the pair of current images and feature information for the one or more pairs of historical images for the pair of current objects. Finally, the re-identification network is trained using a deep Q-learning network to learn decision behavior. The decision behavior may be one of: "the pair of objects are one and the same object", "the pair of objects are not one and the same object", or "it is uncertain whether the pair of objects are one and the same object". When the decision behavior of the re-identification network is that the pair of objects are one and the same object or the pair of objects are not one and the same object, the identification ends. When the decision behavior of the re-identification network is that it is uncertain whether the pair of objects are one and the same object, the pair of current images are used as a pair of historical images for the pair of current objects and one image is selected randomly from each of two sets of images associated with two objects in the pair of current objects respectively to constitute a pair of current images, and the above steps are repeated.

Preferably, in an example, before training the re-identification network using the reinforcement leaning/deep Q-leaning network, the feature extraction network may be trained in advance. Then, the feature extraction network and the re-identification network may be trained jointly based on the created set of samples and the labeled results.

When training the feature extraction network, it is assumed that the image sequence in the set of images associated with the pair of current objects is $(X, Y)=(\{x_1, \ldots, x_n\}, \{y_1, \ldots, y_n\})$, where $x_1$ denotes an image in X. $f(x_i)$ is defined as the feature extraction network. A convolutional neural network is selected and trained to obtain the feature extraction network $f(\bullet)$. By using a result of average pooling and l2-normalization of the last layer of the convolutional neural network, the image is projected into a high-dimensional feature space. Relative distance relationship between different samples is maintained by means of metric learning. By optimizing all of the classification error, the calibration error and the triplet check error, a certain distance may be kept between the features of different samples in the feature space.

When the reinforcement leaning/deep Q-leaning network is applied to train the re-identification network, it is assumed that the current identification task is the t-th pair of images. The t-th input information to the re-identification network is represented as a state $s_t$, and the decision behavior of the re-identification network is represented as an action at, i.e., they may be represented as a state-action pair $(s_t, a_t)$. Each time a decision behavior is outputted from the re-identification network, a corresponding reward value r is returned (r indicates a reward when it is a positive value, or a penalty when it is a negative value). In order to maximize the cumulative reward for each identification task, the re-identification network needs to obtain different rewards and penalties by trial and error, so as to find out the optimal decision behavior.

When the re-identification network selects "the pair of objects are one and the same object", the identification task ends and the re-identification network determines that the pair of current objects are one and the same object. When the re-identification network selects "the pair of objects are not one and the same object", the identification task ends and the re-identification network determines that the pair of current objects are not one and the same object. When the re-identification network selects "it is uncertain whether the pair of objects are one and the same object", the identification task continues by randomly selecting one image from each of two sets of images associated with two objects in the pair of current objects respectively to constitute a pair of current images for further identification. If the decision behavior of the re-identification network is the same as the labeled result, a reward of "+1" is returned. If the decision behavior of the re-identification network is different from the labeled result, a penalty of "−1" is returned. If the decision behavior of the re-identification network is "it is uncertain whether the pair of objects are one and the same object", a reward of "+0.2" is returned. Of course, these reward values are exemplary only and they can be configured flexibly by those skilled in the art depending on actual requirements.

For any arbitrary state-action pair $(s_t, a_t)$, an attenuated cumulative reward that may be obtained by the re-identification network from the state-action pair $(s_t, a_t)$ is defined as $Q_{(s_t, a_t)}$:

$$Q_{(s_t,a_t)} = r_t + y \cdot \arg\max Q_{(s_t,a_t)}$$

where y is a real number smaller than 1 (y may be set to 0.9 in some embodiments of the present disclosure).

Figure 6A:
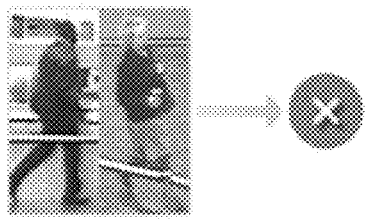
FIG. 6A is a schematic diagram showing a person re-identification based on easy samples according to some embodiments of the present disclosure.
Figure 6A:
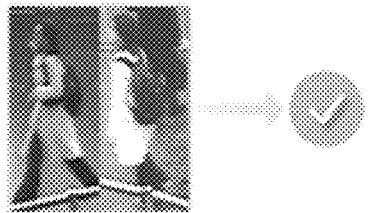
Figure 6B:
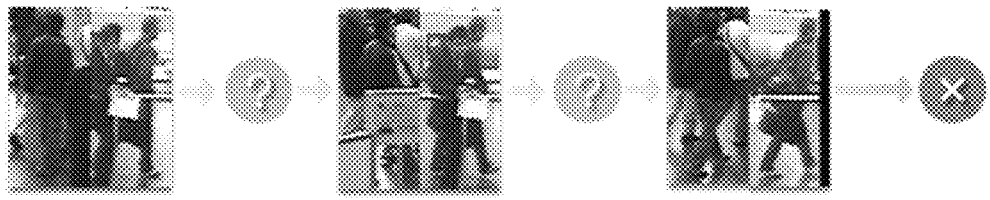
FIG. 6B is a schematic diagram showing a person re-identification based on hard samples according to some embodiments of the present disclosure.
Figure 6B:
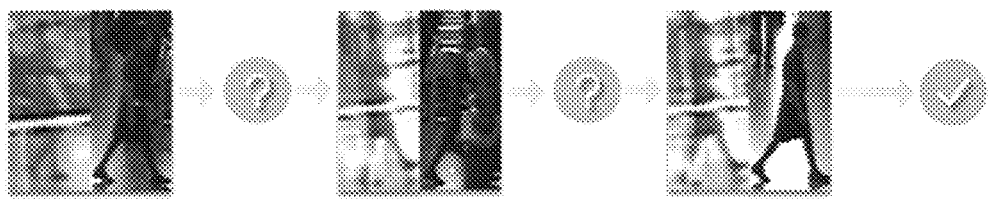

FIGS. 6A and 6B are schematic diagrams each showing an identification using the method for object re-identification according to Embodiment 1 of the present disclosure in an application scenario of person re-identification. For easy samples (i.e., images are clear, without occlusions or blurs), as shown in FIG. 6A, only one pair of images are needed to determine certainly whether they relate to one and the same person. For hard samples (i.e., images are unclear, with occlusions or blurs), as shown in FIG. 6B (where the images in the first line contain occlusions and the images in the second line contain blurs), three pairs of images are used to determine certainly whether they relate to one and the same person. In FIGS. 6A and 6B, a cross represents a determination result that they are not one and the same object, a tick represents a determination result that they are one and the same object, and a question mark represents a determination result that it is uncertain whether they are one and the same object.

The solution of the present disclosure has been verified by means of object identification based on a plurality of frames, including some large-scale data sets. It has achieved excellent effects in all cases. It is shown in the experimental data that the method for object re-identification according to the present disclosure may provide a high identification accuracy using only 3% to 6% of amount of image data that would be required traditionally, thereby improving the speed and efficiency of the re-identification.

Embodiment 2

Figure 7:
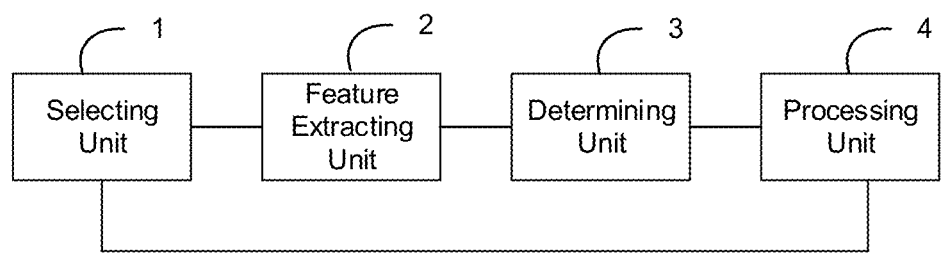
FIG. 7 is a schematic diagram showing a structure of an apparatus for object re-identification according to some embodiments of the present disclosure.

Based on the same concept as the method for object re-identification according to the above Embodiment 1, in Embodiment 2 of the present disclosure, an apparatus for object re-identification is provide. The apparatus has a structure shown in FIG. 7 and includes a selecting unit 1, a feature extracting unit 2, a determining unit 3 and a processing unit 4. For each pair of objects:

the selecting unit 1 is configured to select one image from each of two sets of images associated with two objects in the pair of objects respectively, to constitute a pair of current images for the pair of objects;

the feature extracting unit 2 is configured to input the pair of current images to a preconfigured feature extraction network, to obtain feature information for the pair of current images;

the determining unit 3 is configured to determine whether the pair of objects are one and the same object based on the feature information for the pair of current images and feature information for one or more pairs of historical images for the pair of objects by using a preconfigured re-identification network; and the processing unit 4 is configured to output a determination result obtained by the determining unit 3 when the determination result is that the pair of objects are one and the same object or that the pair of objects are not one and the same object, or use the pair of current images as a pair of historical images for the pair of objects and trigger the selecting unit 1 when the determination result is that it is uncertain whether the pair of objects are one and the same object.

In some embodiments, the determining unit 3 may include: a calculating sub-unit configured to calculate input information to the re-identification network based on the feature information for the pair of current images and the feature information for the one or more pairs of historical images for the pair of objects; and a determining sub-unit configured to input the input information to the re-identification network to obtain the determination result as to whether the pair of objects are one and the same object.

In some embodiments, the determining sub-unit may be configured to: input the input information to the re-identification network; and calculate for the pair of objects, by using the re-identification network, an evaluation value for each of a result that the pair of objects are one and the same object, a result that the pair of objects are not one and the same object or a result that it is uncertain whether the pair of objects are one and the same object, and determine one of the results that has the largest evaluation value as the determination result. In some embodiments of the present disclosure, the evaluation value for the result that the pair of objects are one and the same object is represented as $Q_s$, the evaluation value for the result that the pair of objects are not one and the same object is represented as $Q_d$, and the evaluation value for the result that it is uncertain whether the pair of objects are one and the same object is represented as $Q_u$.

In some embodiments, in order to prevent an infinite loop without stop due to some extreme cases (e.g., when consecutive determination results are always that it is uncertain whether the pair of objects are one and the same object), in some embodiments of the present disclosure, an end condition may be set in advance. For example, the end condition may be set as terminating the loop when the number of consecutive determination results that it is uncertain whether the pair of objects are one and the same object reaches a predetermined number threshold, or terminating the loop when all the pairs of images in the respective sets of images associated with the two objects in the pair of objects have been used in the calculation. In this case, the determining sub-unit may be configured to: input the input information to the re-identification network to obtain a determination result as to whether the pair of objects are one and the same object. If the determination result is that the pair of objects are one and the same object or that the pair of objects are not one and the same object, the determining sub-unit may be configured to output the determination result to the processing unit 4. If the determination result is that it is uncertain whether the pair of objects are one and the same object, the determining sub-unit may be configured to determine whether the predetermined end condition is satisfied. If the predetermined end condition is not satisfied, the determining sub-unit may be configured to output the determination result to the processing unit 4. If the predetermined end condition is satisfied, the determining sub-unit may be configured to compare the evaluation value for the result that the pair of objects are one and the same object and the evaluation value for the result that the pair of objects are not one and the same object, as obtained in the current calculation, and output the result having the larger evaluation value to the processing unit 4 as the final determination result. For example, when $Q_s$ is larger than $Q_d$, it is determined that the pair of objects are one and the same object. When $Q_s$ is smaller than $Q_d$, it is determined that the pair of objects are not one and the same object.

In Example 1, the calculating sub-unit may be configured to: calculate differences between respective features of two images in the pair of current images to obtain a feature difference vector for the pair of current images, and determine the feature difference vector for the pair of current images as the input information.

In Example 2, the calculating sub-unit may be configured to: calculate a weighted average of feature difference vectors for the one or more pairs of historical images for the pair of objects to obtain a historical feature difference vector, and determine the historical feature difference vector as the input information.

In Example 3, the calculating sub-unit may be configured to: calculate the differences between respective features of the two images in the pair of current images to obtain the feature difference vector for the pair of current images, calculate the weighted average of feature difference vectors for the one or more pairs of historical images for the pair of objects to obtain the historical feature difference vector, and determine the feature difference vector for the pair of current images and the historical feature difference vector as the input information.

In Example 4, the calculating sub-unit may be configured to: divide the images in the pair of current images and the one or more pairs of historical images for the pair of objects into two sets of images in accordance with their associated objects, and pair every two images in the two sets of images to obtain a plurality of regrouped pairs of images; and calculate a matching value between respective features of two images in each of the plurality of regrouped pairs of images, determine a distance feature based on the matching values for all of the plurality of regrouped pairs of images, and determine the distance feature as the input information.

In Example 5, the calculating sub-unit may be configured to: calculate differences between respective features of two images in the pair of current images to obtain a feature difference vector for the pair of current images; divide the images in the pair of current images and the one or more pairs of historical images for the pair of objects into two sets of images in accordance with their associated objects, pair every two images in the two sets of images to obtain a plurality of regrouped pairs of images, calculate a matching value between respective features of two images in each of the plurality of regrouped pairs of images, and determine a distance feature based on the matching values for all of the plurality of regrouped pairs of images; and determine the feature difference vector and the distance feature as the input information.

In Example 6, the calculating sub-unit may be configured to: calculate a weighted average of feature difference vectors for the one or more pairs of historical images for the pair of objects to obtain a historical feature difference vector; divide the images in the pair of current images and the one or more pairs of historical images for the pair of objects into two sets of images in accordance with their associated objects, pair every two images in the two sets of images to obtain a plurality of regrouped pairs of images, calculate a matching value between respective features of two images in each of the plurality of regrouped pairs of images, and determine a distance feature based on the matching values for all of the plurality of regrouped pairs of images; and determine the historical feature difference vector and the distance feature as the input information.

In Example 7, the calculating sub-unit may be configured to: calculate differences between respective features of two images in the pair of current images to obtain a feature difference vector for the pair of current images; calculate a weighted average of feature difference vectors for the one or more pairs of historical images for the pair of objects to obtain a historical feature difference vector; divide the images in the pair of current images and the one or more pairs of historical images for the pair of objects into two sets of images in accordance with their associated objects, pair every two images in the two sets of images to obtain a plurality of regrouped pairs of images, calculate a matching value between respective features of two images in each of the plurality of regrouped pairs of images, and determine a distance feature based on the matching values for all of the plurality of regrouped pairs of images; and determine the feature difference vector, the historical feature difference vector and the distance feature as the input information.

In some embodiments, in the above Examples 4~7, the type of the matching value may be a distance value, a dot product value, or both. For different types of matching values, the calculating sub-unit may be configured to calculate the matching value between respective features of two images in each of the plurality of regrouped pairs of images and determine the distance feature based on the matching values for all of the plurality of regrouped pairs of images as follows.

Case 1: The matching value may be a distance value and the calculating sub-unit may be configured to: calculate a distance value between the respective features of the two images in each of the plurality of regrouped pairs of images; select a maximum distance value and a minimum distance value among the distance values for all the plurality of regrouped pairs of images, and calculate an average of the distance values for all the plurality of regrouped pairs of images to obtain an average distance value; and determine the maximum distance value, the minimum distance value and the average distance value as the distance feature.

Case 2: The matching value may be a dot product value and the calculating sub-unit may be configured to: calculate a dot product value between the respective features of the two images in each of the plurality of regrouped pairs of images; select a maximum dot product value and a minimum dot product value among the dot product values for all the plurality of regrouped pairs of images, and calculate an average of the dot product values for all the plurality of regrouped pairs of images to obtain an average dot product value; and determine the maximum dot product value, the minimum dot product value and the average dot product value as the distance feature.

Case 3: The matching value may include a distance value and a dot product value and the calculating sub-unit may be configured to: calculate a distance value between the respective features of the two images in each of the plurality of regrouped pairs of images, select a maximum distance value and a minimum distance value among the distance values for all the plurality of regrouped pairs of images, and calculate an average of the distance values for all the plurality of regrouped pairs of images to obtain an average distance value; calculate a dot product value between the respective features of the two images in each of the plurality of regrouped pairs of images, select a maximum dot product value and a minimum dot product value among the dot product values for all the plurality of regrouped pairs of images, and calculate an average of the dot product values for all the plurality of regrouped pairs of images to obtain an average dot product value; and determine the maximum distance value, the minimum distance value, the average distance value, the maximum dot product value, the minimum dot product value and the average dot product value as the distance feature.

In the above example, regarding how the calculating sub-unit may calculate the feature difference vector for the pair of current images and the historical feature difference vector, reference can be made to Embodiment 1 and details thereof will be omitted here.

In the above example, regarding how the calculating sub-unit may calculate the distance feature, reference can be made to Embodiment 1 and details thereof will be omitted here.

In some embodiments, the re-identification network may have an exemplary structure including sequentially an input layer, two fully connected layers and an output layer. For example, each fully connected layer may have 128 dimensions and the output layer may have 3 dimensions. The structure of the re-identification network can be configured flexibly by those skilled in the art depending on actual requirements, and the present disclosure is not limited to any specific structure of the re-identification network.

In some embodiments of the present disclosure, regarding the training of the feature extraction network and the re-identification network, reference can be made to Embodiment 1 and details thereof will be omitted here. The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for object re-identification, comprising, for each pair of objects:

selecting one image from each of two sets of images associated with two objects in the pair of objects respectively, to constitute a pair of current images for the pair of objects;

inputting the pair of current images to a preconfigured feature extraction network, to obtain feature information for the pair of current images;

determining whether the pair of objects are one and the same object based on the feature information for the pair of current images and feature information for one or more pairs of historical images for the pair of objects by using a preconfigured re-identification network, comprising:

calculating input information to the re-identification network based on the feature information for the pair of current images and the feature information for the one or more pairs of historical images for the pair of objects; and inputting the input information to the re-identification network to obtain a determination result as to whether the pair of objects are one and the same object; and outputting the determination result of said determining when the determination result is that the pair of objects are one and the same object or that the pair of objects are not one and the same object, or repeating the above steps using the pair of current images as a pair of historical images for the pair of objects when the determination result is that it is uncertain whether the pair of objects are one and the same object, wherein said calculating the input information to the re-identification network based on the feature information for the pair of current images and the feature information for the one or more pairs of historical images for the pair of objects comprises one of:

dividing the images in the pair of current images and the one or more pairs of historical images for the pair of objects into two sets of images in accordance with their associated objects, and pairing every two images in the two sets of images to obtain a plurality of regrouped pairs of images and calculating a matching value between respective features of two images in each of the plurality of regrouped pairs of images, determining a distance feature based on the matching values for all of the plurality of regrouped pairs of images, and determining the distance feature as the input information; or calculating differences between respective features of two images in the pair of current images to obtain a feature difference vector for the pair of current images, dividing the images in the pair of current images and the one or more pairs of historical images for the pair of objects into two sets of images in accordance with their associated objects, pairing every two images in the two sets of images to obtain a plurality of regrouped pairs of images, calculating a matching value between respective features of two images in each of the plurality of regrouped pairs of images, determining a distance feature based on the matching values for all of the plurality of regrouped pairs of images and determining the feature difference vector and the distance feature as the input information; or calculating a weighted average of feature difference vectors for the one or more pairs of historical images for the pair of objects to obtain a historical feature difference vector, dividing the images in the pair of current images and the one or more pairs of historical images for the pair of objects into two sets of images in accordance with their associated objects, pairing every two images in the two sets of images to obtain a plurality of regrouped pairs of images, calculating a matching value between respective features of two images in each of the plurality of regrouped pairs of images, determining a distance feature based on the matching values for all of the plurality of regrouped pairs of images, and determining the historical feature difference vector and the distance feature as the input information; or calculating differences between respective features of two images in the pair of current images to obtain a feature difference vector for the pair of current images, calculating a weighted average of feature difference vectors for the one or more pairs of historical images for the pair of objects to obtain a historical feature difference vector, dividing the images in the pair of current images and the one or more pairs of historical images for the pair of objects into two sets of images in accordance with their associated objects, pairing every two images in the two sets of images to obtain a plurality of regrouped pairs of images, calculating a matching value between respective features of two images in each of the plurality of regrouped pairs of images, determining a distance feature based on the matching values for all of the plurality of regrouped pairs of images, and determining the feature difference vector, the historical feature difference vector and the distance feature as the input information.

2. The method of claim 1, wherein the matching value is a distance value and said calculating the matching value between the respective features of the two images in each of the plurality of regrouped pairs of images and determining the distance feature based on the matching values for all of the plurality of regrouped pairs of images comprise:

calculating a distance value between the respective features of the two images in each of the plurality of regrouped pairs of images;

selecting a maximum distance value and a minimum distance value among the distance values for all the plurality of regrouped pairs of images, and calculating an average of the distance values for all the plurality of regrouped pairs of images to obtain an average distance value; and determining the maximum distance value, the minimum distance value and the average distance value as the distance feature.

3. The method of claim 1, wherein the matching value is a dot product value and said calculating the matching value between the respective features of the two images in each of the plurality of regrouped pairs of images and determining the distance feature based on the matching values for all of the plurality of regrouped pairs of images comprise:

calculating a dot product value between the respective features of the two images in each of the plurality of regrouped pairs of images;

selecting a maximum dot product value and a minimum dot product value among the dot product values for all the plurality of regrouped pairs of images, and calculating an average of the dot product values for all the plurality of regrouped pairs of images to obtain an average dot product value; and determining the maximum dot product value, the minimum dot product value and the average dot product value as the distance feature.

4. The method of claim 1, wherein the matching value comprises a distance value and a dot product value and said calculating the matching value between the respective features of the two images in each of the plurality of regrouped pairs of images and determining the distance feature based on the matching values for all of the plurality of regrouped pairs of images comprise:

calculating a distance value between the respective features of the two images in each of the plurality of regrouped pairs of images, selecting a maximum distance value and a minimum distance value among the distance values for all the plurality of regrouped pairs of images, and calculating an average of the distance values for all the plurality of regrouped pairs of images to obtain an average distance value;

calculating a dot product value between the respective features of the two images in each of the plurality of regrouped pairs of images, selecting a maximum dot product value and a minimum dot product value among the dot product values for all the plurality of regrouped pairs of images, and calculating an average of the dot product values for all the plurality of regrouped pairs of images to obtain an average dot product value; and determining the maximum distance value, the minimum distance value, the average distance value, the maximum dot product value, the minimum dot product value and the average dot product value as the distance feature.

5. The method of claim 1, wherein said inputting the input information to the re-identification network to obtain the determination result as to whether the pair of objects are one and the same object comprises:

inputting the input information to the re-identification network; and calculating for the pair of objects, by using the re-identification network, an evaluation value for each of a result that the pair of objects are one and the same object, a result that the pair of objects are not one and the same object or a result that it is uncertain whether the pair of objects are one and the same object, and determining one of the results that has the largest evaluation value as the determination result.

6. The method of claim 1, wherein the re-identification network has a structure comprising sequentially an input layer, two fully connected layers and an output layer.

7. An apparatus for object re-identification, comprising a selecting unit, a feature extracting unit, a determining unit and a processing unit, wherein, for each pair of objects:

the selecting unit is configured to select one image from each of two sets of images associated with two objects in the pair of objects respectively, to constitute a pair of current images for the pair of objects;

the feature extracting unit is configured to input the pair of current images to a preconfigured feature extraction network, to obtain feature information for the pair of current images;

the determining unit is configured to determine whether the pair of objects are one and the same object based on the feature information for the pair of current images and feature information for one or more pairs of historical images for the pair of objects by using a preconfigured re-identification network; and the processing unit is configured to output a determination result obtained by the determining unit when the determination result is that the pair of objects are one and the same object or that the pair of objects are not one and the same object, or use the pair of current images as a pair of historical images for the pair of objects and trigger the selecting unit when the determination result is that it is uncertain whether the pair of objects are one and the same object, wherein the determining unit comprises a calculating sub-unit configured to calculate input information to the re-identification network based on the feature information for the pair of current images and the feature information for the one or more pairs of historical images for the pair of objects, and a determining sub-unit configured to input the input information to the re-identification network to obtain the determination result as to whether the pair of objects are one and the same object, and wherein the calculating sub-unit is configured to perform at least one of:

divide the images in the pair of current images and the one or more pairs of historical images for the pair of objects into two sets of images in accordance with their associated objects, pair every two images in the two sets of images to obtain a plurality of regrouped pairs of images, calculate a matching value between respective features of two images in each of the plurality of regrouped pairs of images, determine a distance feature based on the matching values for all of the plurality of regrouped pairs of images, and determine the distance feature as the input information; or calculate differences between respective features of two images in the pair of current images to obtain a feature difference vector for the pair of current images, divide the images in the pair of current images and the one or more pairs of historical images for the pair of objects into two sets of images in accordance with their associated objects, pair every two images in the two sets of images to obtain a plurality of regrouped pairs of images, calculate a matching value between respective features of two images in each of the plurality of regrouped pairs of images, determine a distance feature based on the matching values for all of the plurality of regrouped pairs of images, and determine the feature difference vector and the distance feature as the input information; or calculate a weighted average of feature difference vectors for the one or more pairs of historical images for the pair of objects to obtain a historical feature difference vector, divide the images in the pair of current images and the one or more pairs of historical images for the pair of objects into two sets of images in accordance with their associated objects, pair every two images in the two sets of images to obtain a plurality of regrouped pairs of images, calculate a matching value between respective features of two images in each of the plurality of regrouped pairs of images, determine a distance feature based on the matching values for all of the plurality of regrouped pairs of images, and determine the historical feature difference vector and the distance feature as the input information; or calculate differences between respective features of two images in the pair of current images to obtain a feature difference vector for the pair of current images, calculate a weighted average of feature difference vectors for the one or more pairs of historical images for the pair of objects to obtain a historical feature difference vector, divide the images in the pair of current images and the one or more pairs of historical images for the pair of objects into two sets of images in accordance with their associated objects, pair every two images in the two sets of images to obtain a plurality of regrouped pairs of images, calculate a matching value between respective features of two images in each of the plurality of regrouped pairs of images, determine a distance feature based on the matching values for all of the plurality of regrouped pairs of images, and determine the feature difference vector, the historical feature difference vector and the distance feature as the input information.

8. The apparatus of claim 7, wherein the matching value is a distance value and the calculating sub-unit is configured to calculate the matching value between the respective features of the two images in each of the plurality of regrouped pairs of images and determine the distance feature based on the matching values for all of the plurality of regrouped pairs of images by:

calculating a distance value between the respective features of the two images in each of the plurality of regrouped pairs of images;

selecting a maximum distance value and a minimum distance value among the distance values for all the plurality of regrouped pairs of images, and calculating an average of the distance values for all the plurality of regrouped pairs of images to obtain an average distance value; and determining the maximum distance value, the minimum distance value and the average distance value as the distance feature.

9. The apparatus of claim 7, wherein the matching value is a dot product value and the calculating sub-unit is configured to calculate the matching value between the respective features of the two images in each of the plurality of regrouped pairs of images and determine the distance feature based on the matching values for all of the plurality of regrouped pairs of images by:

calculating a dot product value between the respective features of the two images in each of the plurality of regrouped pairs of images;

selecting a maximum dot product value and a minimum dot product value among the dot product values for all the plurality of regrouped pairs of images, and calculating an average of the dot product values for all the plurality of regrouped pairs of images to obtain an average dot product value; and determining the maximum dot product value, the minimum dot product value and the average dot product value as the distance feature.

10. The apparatus of claim 7, wherein the matching value comprises a distance value and a dot product value and the calculating sub-unit is configured to calculate the matching value between the respective features of the two images in each of the plurality of regrouped pairs of images and determine the distance feature based on the matching values for all of the plurality of regrouped pairs of images by:

calculating a distance value between the respective features of the two images in each of the plurality of regrouped pairs of images, selecting a maximum distance value and a minimum distance value among the distance values for all the plurality of regrouped pairs of images, and calculating an average of the distance values for all the plurality of regrouped pairs of images to obtain an average distance value;

calculating a dot product value between the respective features of the two images in each of the plurality of regrouped pairs of images, selecting a maximum dot product value and a minimum dot product value among the dot product values for all the plurality of regrouped pairs of images, and calculating an average of the dot product values for all the plurality of regrouped pairs of images to obtain an average dot product value; and determining the maximum distance value, the minimum distance value, the average distance value, the maximum dot product value, the minimum dot product value and the average dot product value as the distance feature.

11. The apparatus of claim 7, wherein the determining sub-unit is configured to:

input the input information to the re-identification network; and calculate for the pair of objects, by using the re-identification network, an evaluation value for each of a result that the pair of objects are one and the same object, a result that the pair of objects are not one and the same object or a result that it is uncertain whether the pair of objects are one and the same object, and determine one of the results that has the largest evaluation value as the determination result.

12. The apparatus of claim 7, wherein the re-identification network has a structure comprising sequentially an input layer, two fully connected layers and an output layer.

13. The method of claim 1, wherein the one image is selected randomly or according to a chronological order.

14. The method of claim 2, wherein the distance value is one of: a Euclidean distance, a Manhattan distance, a Chebyshev distance, a Minkowski distance, a cosine distance, or a Mahalanobis distance.

15. The method of claim 1, wherein the feature extraction network is obtained by training a model based on a neural network that is capable of extracting features from images.

16. The method of claim 1, comprising determining whether a predetermined end condition is satisfied when the determination result is that it is uncertain whether the pair of objects are one and the same object.

17. The apparatus of claim 7, wherein the one image is selected randomly or according to a chronological order.

18. The apparatus of claim 8, wherein the distance value is one of: a Euclidean distance, a Manhattan distance, a Chebyshev distance, a Minkowski distance, a cosine distance, or a Mahalanobis distance.

19. The apparatus of claim 7, wherein the feature extraction network is obtained by training a model based on a neural network that is capable of extracting features from images.

20. The apparatus of claim 7, wherein the determining sub-unit is configured to determine whether a predetermined end condition is satisfied when the determination result is that it is uncertain whether the pair of objects are one and the same object.

* * * * *

UNITED STATES PATENT AND TRADEMARK OFFICE
CERTIFICATE OF CORRECTION

PATENT NO. : 11,093,789 B2
APPLICATION NO. : 16/273835
DATED : August 17, 2021
INVENTOR(S) : Naiyan Wang and Jianfu Zhang Page 1 of 1

It is certified that error appears in the above-identified patent and that said Letters Patent is hereby corrected as shown below:

In the Specification

In Column 9, Line 13, delete "$d_{mm}$" and insert -- $d_{min}$ --, therefor.

In Column 11, Line 11, delete "at," and insert -- $a_t$, --, therefor.

In Column 11, Line 50, delete "$Q_{(s_t,a_t)} = r_t + \gamma \cdot \arg\max Q_{(s_t,a_t)}$" and insert -- $Q_{(s_t,a_t)} = r_t + \gamma \cdot \arg\max Q_{(s_{t+1},a_{t+1})}$ --, therefor.

In Column 11, Line 51, delete "y is a real number smaller than 1 (y" and insert -- γ is a real number smaller than 1 (γ --, therefor.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*